(12) United States Patent
Hallak et al.

(10) Patent No.: US 8,799,705 B2
(45) Date of Patent: Aug. 5, 2014

(54) DATA PROTECTION IN A RANDOM ACCESS DISK ARRAY

(75) Inventors: Renen Hallak, Tel-Aviv (IL); Tal Ben Moshe, Kiryat-Ono (IL); Niko Farhi, Tel-Aviv (IL); Erez Webman, Petach-Tikva (IL)

(73) Assignee: EMC Corporation, Hopkinton, MA (US)

( * ) Notice: Subject to any disclaimer, the term of this patent is extended or adjusted under 35 U.S.C. 154(b) by 320 days.

(21) Appl. No.: 13/420,633

(22) Filed: Mar. 15, 2012

(65) Prior Publication Data
US 2013/0173955 A1  Jul. 4, 2013

Related U.S. Application Data

(60) Provisional application No. 61/582,841, filed on Jan. 4, 2012.

(51) Int. Cl.
*G06F 11/00* (2006.01)
*G06F 11/10* (2006.01)

(52) U.S. Cl.
CPC ........ *G06F 11/1076* (2013.01); *G06F 11/1092* (2013.01)
USPC ........................... 714/6.24; 714/6.2; 714/6.22

(58) Field of Classification Search
CPC .................... G06F 11/1076; G06F 11/1092
USPC .......................................... 714/6.2, 6.22, 6.24
See application file for complete search history.

(56) References Cited

U.S. PATENT DOCUMENTS

| | | | |
|---|---|---|---|
| 2007/0220313 A1* | 9/2007 | Katsuragi et al. ................. | 714/6 |
| 2008/0126844 A1* | 5/2008 | Morita et al. ..................... | 714/6 |
| 2012/0246511 A1* | 9/2012 | Sato ............................... | 714/6.2 |

* cited by examiner

*Primary Examiner* — Sarai Butler
(74) *Attorney, Agent, or Firm* — Krishnendu Gupta; Konrad R. Lee

(57) ABSTRACT

A disk array memory system comprises: a plurality of disks in a disk array for storage of content data and parity data in stripes, content data in a same stripe sharing parity bits of said parity data, each disk having a spare disk capacity including at least some of a predefined array spare capacity, said array spare capacity providing a dynamic space reserve over said array to permit data recovery following a disk failure event; a cache for caching content data prior to writing to said disk array; and a controller configured to select a stripe currently having a largest spare stripe capacity, for a current write operation of data from said cache, thereby to write all said data of said current write operation on a same stripe, thereby to maximize sharing of parity bits per write operation and minimize separate parity write operations.

26 Claims, 9 Drawing Sheets

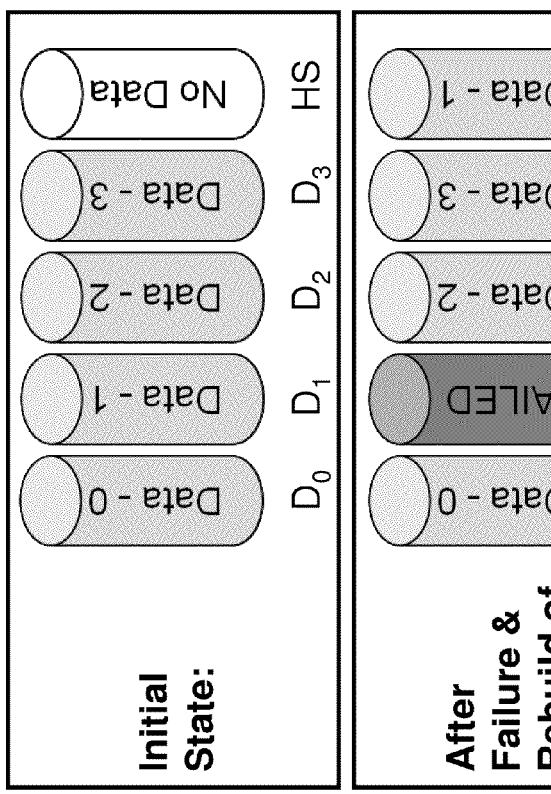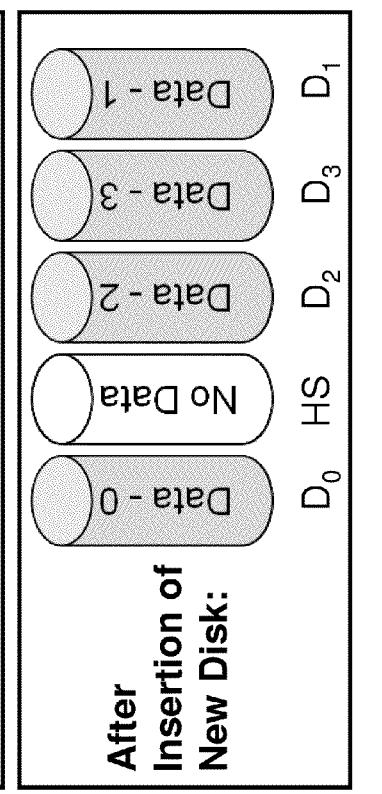
Fig. 1A Initial State:
Fig. 1B After Failure & Rebuild of Disk 1:
Fig. 1C After Insertion of New Disk:
Prior Art

Fig. 2A

Initial State:

| $S_{00}$ | $S_{01}$ | $S_{02}$ | $S_{03}$ | --- |
| $S_{10}$ | $S_{11}$ | $S_{12}$ | $S_{13}$ | --- |
| $S_{20}$ | $S_{21}$ | $S_{22}$ | $S_{23}$ | --- |
| $S_{30}$ | $S_{31}$ | $S_{32}$ | $S_{33}$ | --- |
| $S_{40}$ | $S_{41}$ | $S_{42}$ | $S_{43}$ | --- |
| $D_0$ | $D_1$ | $D_2$ | $D_3$ | $D_4$ |

Fig. 2B

After Failure & Rebuild of Disk 1:

| $S_{00}$ | $S_{01}$ | $S_{02}$ | $S_{03}$ | $S_{13}$ |
| --- | --- | --- | --- | --- |
| $S_{20}$ | $S_{21}$ | $S_{22}$ | $S_{23}$ | $S_{12}$ |
| $S_{30}$ | $S_{31}$ | $S_{32}$ | $S_{33}$ | $S_{11}$ |
| $S_{40}$ | $S_{41}$ | $S_{42}$ | $S_{43}$ | $S_{10}$ |
| $D_0$ | N/A | $D_2$ | $D_3$ | $D_4$ |

Fig. 2C

After Insertion of New Disk:

| $S_{00}$ | $S_{01}$ | $S_{02}$ | $S_{03}$ | --- |
| $S_{10}$ | $S_{11}$ | $S_{12}$ | $S_{13}$ | --- |
| $S_{20}$ | $S_{21}$ | $S_{22}$ | $S_{23}$ | --- |
| $S_{30}$ | $S_{31}$ | $S_{32}$ | $S_{33}$ | --- |
| $S_{40}$ | $S_{41}$ | $S_{42}$ | $S_{43}$ | --- |
| $D_0$ | $D_1$ | $D_2$ | $D_3$ | $D_4$ |

Prior Art

Fig. 3A Initial State:

| D0 | D1 | D2 | D3 | D4 |
|---|---|---|---|---|
| $S0_0$ | $S0_1$ | $S0_2$ | P0 | $S1_0$ |
| $S1_1$ | $S1_2$ | P1 | $S2_0$ | $S2_1$ |
| $S2_2$ | P2 | $S3_0$ | $S3_1$ | $S3_2$ |
| P3 | $S4_0$ | $S4_1$ | $S4_2$ | P4 |

Fig. 3B After Failure & Rebuild of Disk 1:

| D0 | N/A | D2 | D3 | D4 |
|---|---|---|---|---|
| $S0_0$ | | $S0_2$ | P0 | $S1_0$ |
| $S1_1$ | | P1 | $S2_0$ | $S2_1$ |
| $S2_2$ | | $S3_0$ | $S3_1$ | $S3_2$ |
| P3 | | $S4_1$ | $S4_2$ | P4 |
| S40 | | P2 | $S1_2$ | $S0_1$ |

Fig. 3C After Insertion of New Disk:

| D0 | D1 | D2 | D3 | D4 |
|---|---|---|---|---|
| $S0_0$ | $S0_1$ | $S0_2$ | P0 | $S1_0$ |
| $S1_1$ | $S1_2$ | P1 | $S2_0$ | $S2_1$ |
| $S2_2$ | P2 | $S3_0$ | $S3_1$ | $S3_2$ |
| P3 | $S4_0$ | $S4_1$ | $S4_2$ | P4 |

Prior Art

DATA PROTECTION IN A RANDOM ACCESS DISK ARRAY

RELATED APPLICATION

This application claims the benefit of priority under 35 USC §119(e) of U.S. Provisional Patent Application No. 61/582,841 filed Jan. 4, 2012, the contents of which are incorporated herein by reference in their entirety.

FIELD AND BACKGROUND OF THE INVENTION

The present invention, in some embodiments thereof, relates to data protection in a random access disk array, and, more particularly, but not exclusively, to a variation of a RAID system to provide for data protection.

Raid is an acronym for Redundant Array of Independent Disks, and is a system for storing data on multiple disks in which redundancy of data storage between the disks ensures recovery of the data in the event of failure. This is achieved by combining multiple disk drive components into a logical unit, where data is distributed across the drives in one of several ways called RAID levels.

RAID is now used as an umbrella term for computer data storage schemes that can divide and replicate data among multiple physical disk drives. The terms disks and drives will be used interchangeably henceforth. The physical disks are said to be in a RAID array, which is accessed by the operating system as one single disk. The different schemes or architectures are named by the word RAID followed by a number (e.g., RAID 0, RAID 1). Each scheme provides a different balance between three key goals: increasing data reliability, decreasing capacity overhead and increasing input/output performance.

The most basic form of RAID—a building block for the other levels but not used for data protection, is Raid 0, which has high performance but no redundancy. The data is spread evenly between N disks. RAID 0 gives maximum performance since data retrieval is carried out on all N disks in parallel. However each data item is stored exactly once so disk failure always loses some data.

RAID 1 requires mirroring of all the data. Capacity drops by 50% since all data is stored twice, but excellent performance is still achieved since the data is still spread between disks in the same way, allowing for parallel reads. RAID 1 can support failure of one of each pair of disks, however the price is the loss of half of the capacity. Although multiple disk failures can be tolerated, only one failure is possible per mirrored pair without loss of data.

In greater detail, RAID 1 is mirroring. Mirroring comprises writing each block of data to two disks, $D_0$ and $D_1$, and reconstructing a disk by copying its minor disk upon failure. This method requires performing two disk writes per user write, and consumes an overhead of 100% in capacity. Its rebuild requires performing reads and writes in proportion to the size of the failed disk, without additional computation penalties. Additionally, reading data which resided on the failed disk while in degraded mode requires a single disk read, just as under a normal system operation.

In general, RAID-1 protects from single disk failure. It may protect from more than one failure if no two failed disks are part of the same pair, known as a "RAID group". RAID-1 may also be implemented in "n-way mirroring" mode to protect against any n−1 disk failures. An example is RAID 1.3 which introduced three way mirroring, so that any two disks could fail and all the data could still be recovered. The cost however is that there is only 33% utilization of the disks.

A requirement thus became apparent, to somehow develop a system that allowed for the system to recover all data after the failure of any disk at the cost of a more reasonable overhead, and as a result RAID 4 was developed.

RAID 4 uses a parity bit to allow data recovery following failure of a bit. In RAID 4 data is written over a series of N disks and then a parity bit is set on the N+1 disk. Thus if N is 9, then data is written to 9 disks, and on the tenth, a parity of the nine bits is written. If one disk fails the parity allows for recovery of the lost bit. The failure problem is solved without any major loss of capacity. The utilization rate is 90%. However the tenth disk has to be changed with every change of every single bit on any of the nine disks, thus causing a system bottleneck.

In greater detail, a RAID-4 group contains k data disks and a single parity disk. Each block i in the parity disk P contains the XOR of the blocks at location i in each of the data disks. Reconstructing a failed disk is done by computing the parity of the remaining k disks. The capacity overhead is 1/k. This method contains two types of user writes—full stripe writes known as "encode" and partial stripe modifications known as "update". When encoding a full stripe, an additional disk write must be performed for every k user writes, and k−1 XORs must be performed to calculate the parity. When modifying a single block in the stripe, two disk reads and two disk writes must be performed, as well as two XORs to compute the new parity value. The rebuild of a failed block requires reading k blocks, performing k−1 XORs, and writing the computed value. Reading data which resided on the failed disk while in degraded mode also requires k disk reads and k−1 XOR computations. RAID-4, like RAID-1, protects from a single disk failure.

RAID 5 solves the bottleneck problem of RAID 4 in that parity stripes are spread over all the disks. Thus, although some parity bit somewhere has to be changed with every single change in the data, the changes are spread over all the disks and no bottleneck develops.

However RAID 5 still only allows for a single disk failure.

In order to combine the multiple disk failure of RAID 1.3 with the high utilization rates of RAID 4 and 5, and in addition to avoid system bottlenecks, Raid 6 was specified to use an N+2 parity scheme that allows failure of two disks. RAID 6 defines block-level striping with double distributed parity and provides fault tolerance of two drive failures, so that the array continues to operate with up to two failed drives, irrespective of which two drives fail. Larger RAID disk groups become more practical, especially for high-availability systems. This becomes increasingly important as large-capacity drives lengthen the time needed to recover from the failure of a single drive. Following loss of a drive, single-parity RAID levels are as vulnerable to data loss as a RAID 0 array until the failed drive is replaced and its data rebuilt, but of course the larger the drive, the longer the rebuild takes, causing a large vulnerability interval. The double parity provided by RAID 6 gives time to rebuild the array without the data being at risk if a single additional drive fails before the rebuild is complete.

Reference is now made to FIGS. 1A to 1C which show three stages of a method for data protection using a spare disk, known as a hot spare. In traditional disk arrays, using physical magnetic disks, data protection often involved having a hot spare disk. As shown in FIG. 1A, this hot spare disk is not used during normal system operation, but rather is kept empty, and used only when a regular disk failed. At this point an exact copy of the failed disk is recovered and written to the spare disk, as shown in FIG. 1B. During recovery, the lost data is written to the new disk exactly in the same fashion as it resided on the old disk. When the old disk is replaced, as shown in FIG. 1C, its replacement becomes the new hot spare disk. The hot spare method cannot handle the recovery of more than a single disk without human intervention of manually replacing the failed disk with an empty disk, unless you keep several hot-spare disks. The cost of keeping this spare disk is that it is not used during normal system operation and thus it reduces the total performance of the system. Another downside of having a single disk replace the failed disk is that the hot spare disk receives a storm of writes during recovery and becomes a system bottleneck, causing the recovery, or rebuild, process to take a while to complete.

Reference is now made to FIGS. 2A to 2C, which show a variation of the spare hot disk system in which space for the rewrite is reserved, or dedicated, across all the disks of the array, as is common in more contemporary arrays. Keeping dedicated spare space across all the disks is slightly more complex than keeping a dedicated spare disk. A coarse granularity, possibly static, mapping must be held between sections of the failed disk and hot spare sections distributed across the rest of the disks. This mapping should be smart in the sense that lost sections are not written to disks which have other sections in the same stripe as the lost section. FIG. 2A illustrates the initial state or state during normal operation. During normal operation, the dedicated spare sections are reserved and not be written to. As shown in FIG. 2B, during recovery, the lost data in each section is copied to a hot spare section on one of the remaining disks. This method mediates some of the faults of the previous option. The cost of keeping spare space is lower, since there is no performance penalty of having disks which are not used. Writing the lost data is also distributed across all the disks, reducing the recovery bottleneck and thus decreasing the recovery time. However, the overhead of the method of FIGS. 2A-2C is that when the old disks are replaced, the sections must be copied back to them, thus doubling the number of writes needed. Half of the writes are distributed across all disks, and the remaining half go to a single disk.

FIG. 2C illustrates such a recovery process. This also implies that a rebuild abort process, in case a failed (removed) disk is reinserted, will actually need to undo the work which was already performed and copy back the data. If dedicated spare space which is equal to the size of x disks is kept, x recoveries can be performed without human intervention. This x must be decided upon in advance and cannot change dynamically.

Previously Used IO Reduction Methods

The main problem with N+K RAID schemes such as RAID 4/5/6 (as opposed to RAID 1) is the IO overhead incurred upon user writes during regular system operation. RAID 1 has a single write overhead per user write, while RAID 4/5 have a penalty of 2 reads and 1 write on top of the user write, and RAID 6 schemes have a penalty of 3 reads and 2 writes. Thus, the main method used for reducing 10 overhead and increasing performance was to use a RAID 1 scheme.

Reference is now made to FIGS. 3A-3C, which illustrate the dedicated spare space method of FIGS. 2A-2C in a RAID 5 scheme. The S stripes contain data and the P stripes contain parity. FIG. 3A shows the initial state, during normal system operation. FIG. 3B shows the state during rebuild after failure of disk D1, and FIG. 3C shows the system after insertion of a new disk to replace the failed D1.

In all these N+K RAID schemes, encoding a full stripe of redundant data for protection is much more efficient in terms of IOs and computation, than updating a single block in that stripe. In fact, it is even more efficient than the RAID 1 alternative. However, forcing the writing of full stripes on magnetic drives, using various log structured approaches, severely degrades performance from a different perspective. The problem with this approach on magnetic drives is that grouping random access user writes into a full stripe harms subsequent sequential read operations by literally randomizing the application's access pattern to the underlying media. In fact, if the underlying media is not naturally random access, this will most likely degrade performance to a greater extent than using the naïve approach with the added 10 overhead it entails.

Under both of the methods of FIGS. 2A-C and FIGS. 3A-C, dedicated spare space must be pre-allocated, and the RAID stripe size is kept constant.

A solution to the general problem, which is agnostic of the user access pattern, does not seem to coincide with the nature of sequential media. Thus, much more complicated heuristics, which were in many cases tailored to specific user access patterns, were used to try to alleviate the problems described above.

SUMMARY OF THE INVENTION

Data is cached for writing to disk. The disk or disk part with the most space is selected for writing together of the cached data in such a way as to share parity bits, and space reserved in any event for disk failure is used as a dynamic space reserve.

According to an aspect of some embodiments of the present invention there is provided a disk array memory system comprising a plurality of disks in a disk array for storage of content data and parity data in stripes, content data in a same stripe sharing parity bits of said parity data, each stripe having a spare stripe capacity including at least some of a predefined array spare capacity, said array spare capacity providing a dynamic space reserve over said array to permit data recovery following a disk failure event;

a cache for caching content data for aggregation prior to writing to said disk array;

a controller configured to select a stripe currently having a largest spare stripe capacity, for a current write operation of aggregated data from said cache, thereby to write all said aggregated data of said current write operation on a same stripe, thereby to maximize sharing of parity bits per write operation and minimize separate parity write operations.

An embodiment may comprise a table for mapping of physical locations of said content data as defined by respective write operations with corresponding logical locations of said data.

In an embodiment, the data is written on said disks in blocks and the table granularity is the block size.

In an embodiment, said controller is configured to use said table to balance write operations between respective disks of said array.

In an embodiment, said controller is configured to use said table to divert a current write operation from a disk which is temporarily unavailable.

In an embodiment, said disk array has a stripe size, said stripe size being differentially variable.

In an embodiment, said disks in said array have respectively different capacities, said stripe size being such as to provide for even distribution of stripes over said disks, in proportion to said respective capacity at each disk.

In an embodiment, stripes have parity columns for said parity bits, said parity columns being distributed evenly over said disks.

In an embodiment, said controller is configured to use said parity data to recover content data lost in said disk failure event and to write said recovered content data into said dynamic space reserve.

In an embodiment, said disk array is arranged into blocks, and each block is assigned one of three states, in use, not in use and not in parity, said not in parity state allowing for ignoring physical data and treating it as zeroed out.

An embodiment may be configured as a RAID 6 array using two parity columns, said two columns being distributed in respectively different directions.

In an embodiment, different amounts of spare stripe capacities are defined for respective sections, thereby to provide variable levels of performance over said array.

According to a second aspect of the present invention there is provided a disk array memory system comprising
a plurality of disks in a disk array for storage of content data and parity data in stripes, content data in a same stripe sharing parity bits of said parity data,
a cache for caching content data prior to writing to said disk array;
a controller configured to select a stripe for a current write operation of data from said cache, thereby to write all said content data of said current write operation and corresponding parity data on a same stripe at a same physical location, and irrespective of logical relationships of parts of said content data; and the controller utilizing a mapping table to map between physical locations and logical relationships of said content data.

According to a third aspect of the present invention there is provided a disk array memory method comprising
providing a plurality of disks in a disk array,
storing content data and parity data in stripes within said disk array, wherein content data in a same stripe shares parity bits of said parity data,
for said array defining an array spare capacity, said array spare capacity providing a dynamic space reserve over said array to permit data recovery following a disk failure event;
caching content data to aggregate data from multiple write operations into a single aggregated write operation prior to writing to said disk array;
selecting a stripe having a largest spare stripe capacity;
writing said aggregated cached data in a single write operation to said selected stripe, thereby to maximize sharing of parity bits per write operation and minimize separate parity write operations.

An embodiment may comprise mapping, using a table, of physical locations of said content data as defined by respective write operations with corresponding logical locations of said data.

An embodiment may comprise using said table to balance write operations between respective disks of said array.

An embodiment may use said table to divert a current write operation from a disk which is temporarily unavailable.

In an embodiment, the stripe size may be differentially variable.

In an embodiment, said disks in said array have respectively different capacities, said stripe size being such as to provide for even distribution of stripes over said disks, in proportion to said respective capacity at each disk.

In an embodiment, stripes have parity columns for said parity bits, said parity columns being distributed evenly over said disks.

An embodiment may use said parity data to recover content data lost in said disk failure event and to write said recovered content data into said dynamic space reserve.

In an embodiment, said disk array is arranged into blocks, and each block is assigned one of three states, in use, not in use and not in parity, said not in parity state allowing for ignoring physical data and treating it as zeroed out.

An embodiment may be configured as a RAID 6 array using two parity columns, said two columns being distributed in respectively different directions.

Different amounts of spare stripe capacities may be defined for respective sections, thereby to provide variable levels of performance over said array.

According to a fourth aspect of the present invention there is provided a disk array memory method comprising
providing a plurality of disks in a disk array for storage of content data and parity data in stripes, content data in a same stripe sharing parity bits of said parity data,
caching content data prior to writing to said disk array;
selecting a stripe for a current write operation of data from said cache, thereby to write all said content data of said current write operation and corresponding parity data on a same stripe at a same physical location, and irrespective of logical relationships of parts of said content data; and
utilizing a mapping table to map between physical locations and logical relationships of said content data.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-1C are a block diagram of a prior art hot spare disk method of data protection;

FIGS. 2A-2C are a block diagram of a prior art dedicated spare space method of data protection;

FIGS. 3A-3C are a block diagram illustrating the prior art dedicated spare space method used with a RAID 5 scheme;

DESCRIPTION OF SPECIFIC EMBODIMENTS OF THE INVENTION

Figure 4:
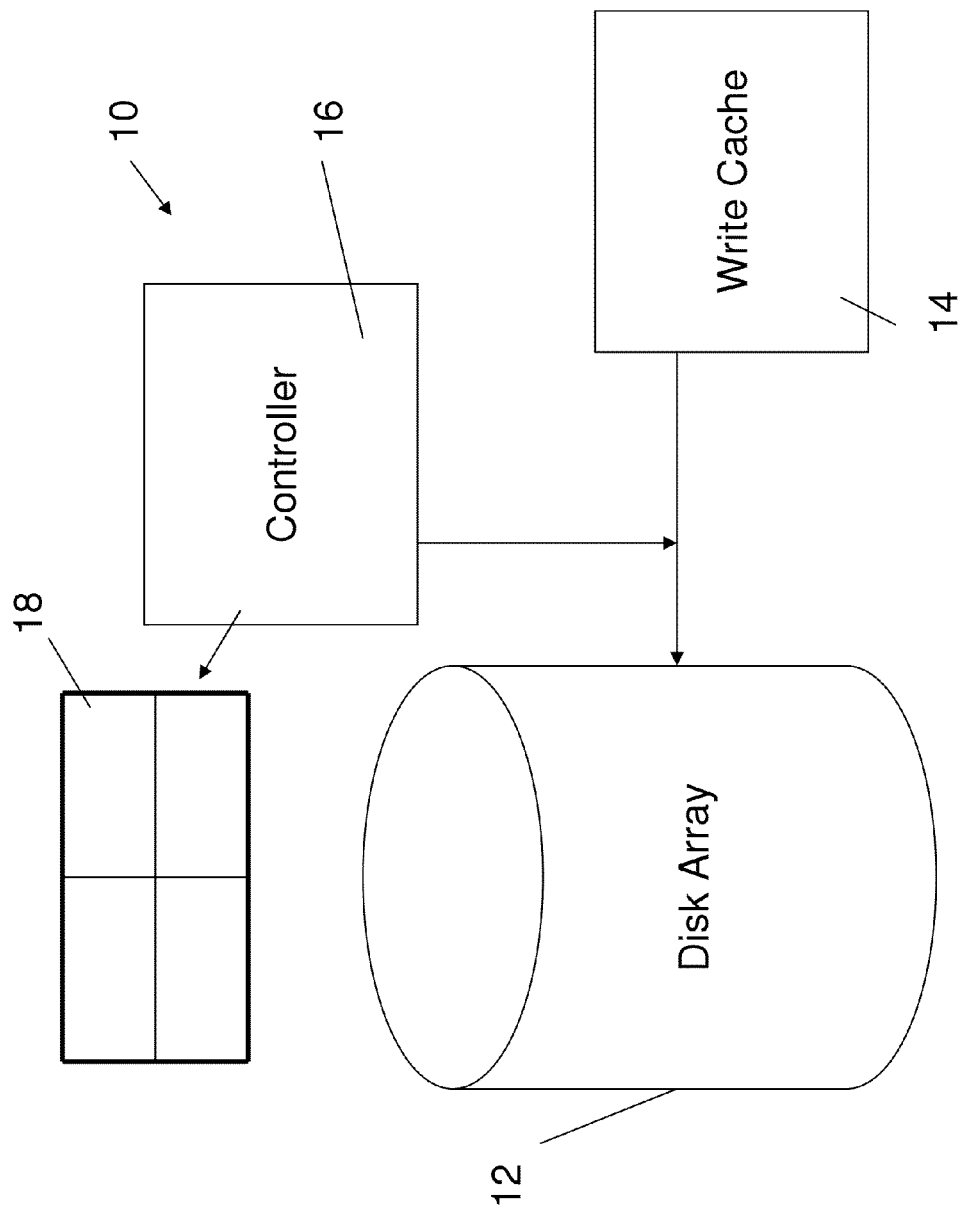
FIG. 4 is a simplified block diagram of a RAID memory device according to a first embodiment of the present invention.

The present invention, in some embodiments thereof, relates to data protection in a random access disk array, and, more particularly, but not exclusively, to a variation of a RAID system to provide for data protection.

The present embodiments may provide a data protection system for a RAID memory device containing random access media, which is based on logical to physical mappings at fine granularity on the random access media. By fine granularity is meant that the mapping is to the block size, the block being the smallest unit to which data is written, 4 k being a typical block size. According to the present embodiments there is no need to keep dedicated spare space, rather one can use ordinary space to store recovered data by changing the mapping information.

The embodiments may use variable sized stripes to reduce parity overhead and allow easy addition/removal of disks.

The embodiments may balance and re-balance data across the various disks since the placement of blocks is flexible due to the random access nature of the media and the mapping table.

The embodiments may write new data or updates so as to fill the emptiest stripe. In combination with keeping fairly little spare capacity the concentration of the current write to a single stripe may considerably reduce IO overhead induced by the RAID scheme. As the disks are solid state disks rather than magnetic disks, no issue is raised by the fact that blocks of data that belong together are stored at widely separate physical locations.

The spare capacity that is kept can be the same space used for recovery purposes.

For purposes of better understanding some embodiments of the present invention, as illustrated in FIGS. 4-9 of the drawings, reference has been made in the background to the construction and operation of three prior art data protection systems for disk arrays, as illustrated in FIGS. 1-3.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 5:
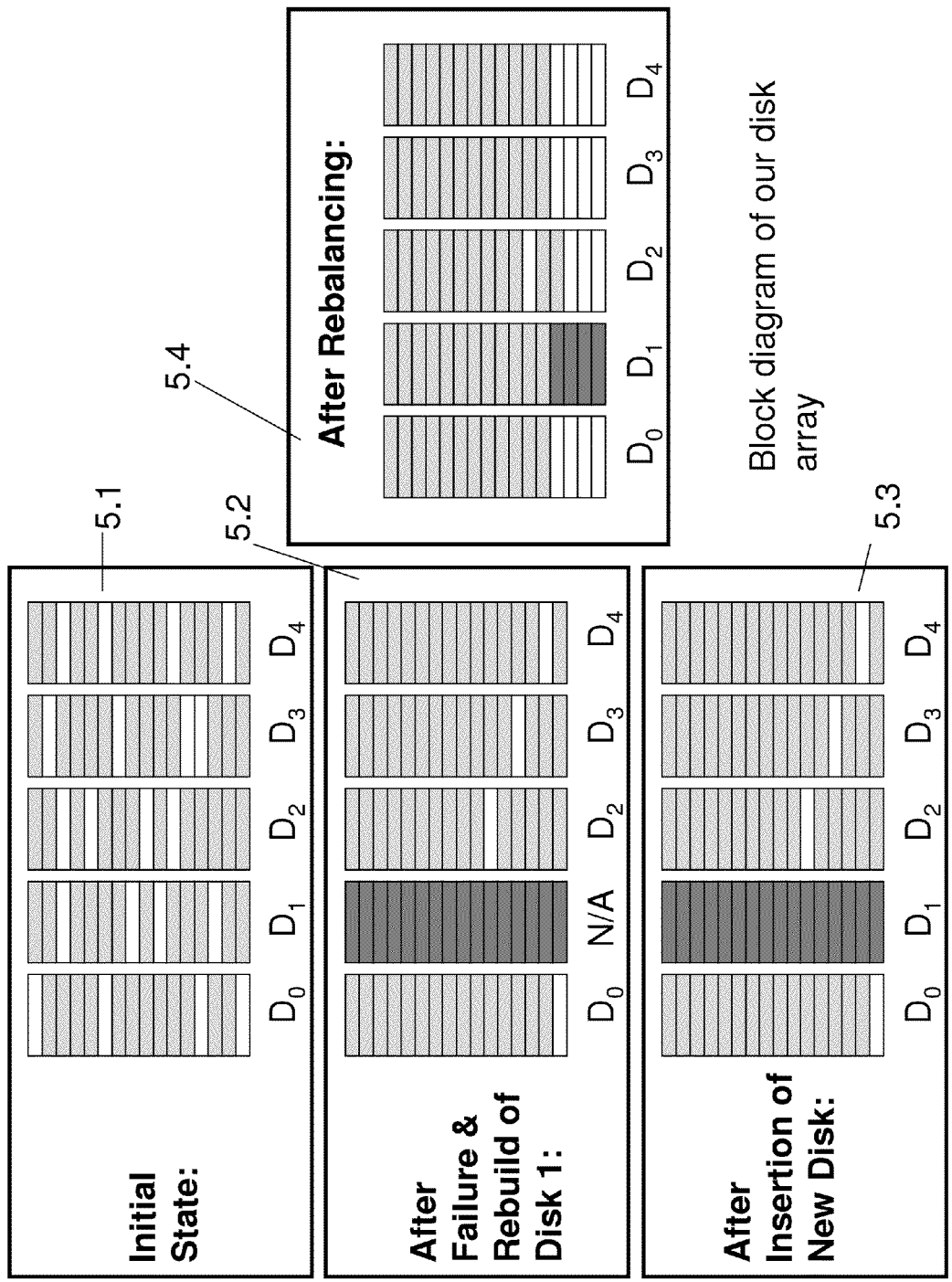
FIG. 5 is a simplified block diagram of a disk array with stripes configured according to the present embodiments.

Referring now to the drawings, FIG. 4 illustrates a disk array memory system 10 according to an embodiment of the present invention. FIG. 5 illustrates the various states of the disk array during operation of the embodiment. Within the system is a disk array 12 in which content data and parity data are stored in stripes, the stripes being units of content data and their corresponding parity columns. The stripes may be smaller than, larger than or the same as the disks. In each stripe, content data shares parity bits but different stripes have different parity columns and are protected independently from data loss or corruption.

Each disk in the array, and likewise each stripe, has spare capacity made up of unused blocks. A certain amount of the unused capacity is a predefined array spare capacity which is intended for writing recovered data following a disk failure. The array defines the amount of space that is to be reserved for a disk failure but not its physical location, thus the spare capacity is in the form of a dynamic space reserve spread over the array. The array spare capacity may thus migrate between different physical data blocks over the lifetime of the array. The array may for example be preset so that 10% of the capacity is kept spare. In such a case each individual disk in the array may have its own spare disk capacity which may vary statistically depending on the use of the device but the array will refuse to accept further data when the 90% global array limit is reached. Likewise each stripe has a spare stripe capacity, again which is free to vary, as long as the overall disk array does not exceed the 90% data limit. The initial state, or state during normal disk operation, is illustrated as state 5.1 in FIG. 5, which shows data blocks on each one of a series of disks. The blocks are indicated as either used or empty.

The system includes a write cache 14 which caches content data prior to writing to the disk array 12, so that write operations can be aggregated. A controller 16 selects a stripe for the aggregated write operation, and looks for the stripe currently having the largest spare stripe capacity. The current write operation is then made of the aggregated data to a single stripe, thus minimizing the number of separate parity bits that need to be written. All the data of the aggregated write operation is written onto a single stripe, and this has the effect of maximizing sharing of parity bits per write operation and thus minimizing separate parity write operations.

A table 18 is used to map physical locations of the content data on the disks and stripes as defined by the write operations with corresponding logical locations of the data. The result of aggregating the write operations is that storage of the data at the physical locations ceases to be constrained by the relationship of the data to other data. In other words the storage ceases to be sequential. For a magnetic disk where readout rate is affected by inertia of the read head and search time, such an arrangement would be disastrous, but for random access memory such an arrangement is no disadvantage at all, provided that efficient mapping is available to find the correct physical address.

The controller 16 may use the table, not only for data retrieval, but also to balance write operations between different disks on the array so as to ensure even use of the disks.

A common fault of memory arrays is that a disk may be temporarily unavailable, known as a hiccup. For data write a hiccup can be ameliorated by using the memory table 18 to divert a current write operation from the disk which is temporarily unavailable, and thus avoid having to wait for the particular disk to become available again. For a data read, the parity information present on other disks can be used to reconstruct data that is currently on the unavailable disk.

The disk array may have a stripe size, which can be differentially variable, meaning it may vary between disks or vary over the course of the lifetime of the array. That is to say the stripe size is a system setting of the array.

Disks in the array may have respectively different capacities. For example disks added later on to the array may have larger capacities than the original disks. The stripe size may be chosen to provide for even distribution of stripes over the disks, in proportion to the respective capacity at each disk. Such a stripe size provides for even ware of the disks. As will be explained below, a typical stripe size may be decided according to the total capacity of the array divided by the capacity of the largest disk in the array.

In the disks, the stripes have their own parity columns for the parity bits, and the parity columns of the various stripes may be distributed evenly over the various disks of the array, so that no stripe is compromised by the failure of any given disk.

The controller 16 may use the parity data to recover content data lost during a disk failure event, in which case the recovered content data is written into the dynamic space reserve, as discussed above. In such a case array performance may drop until a replacement is provided for the failed disk, since the array has less disks to work with. State 5.2 in FIG. 5 illustrates an exemplary state of the array after failure of disk D1 and rebuild of the array. The amount of spare space is reduced since the blocks have been used to write the recovered data from the lost disk.

The disk array is arranged into blocks, the blocks being the smallest write unit in the array, for example of size 4 k. Typically blocks are assigned two states, in use or not in use. In an embodiment, the blocks may be assigned one of three states, in use, not in use and not in parity. The "not in parity" state means that the data is still there but for parity purposes is marked as being all zeroes. By using this state, new disks may be added without actual physical zeroing out of their data.

If a disk is erroneously removed, starting a data recovery operation using parity and error correction, but then is returned before the disk recovery is complete. Any data block that has been rebuilt before the reinsertion of the disk is marked as such, since it is no longer needed and no longer present in the stripe's parity block, but the blocks not already recovered by the parity and error correction can then simply be recovered by retaining the "in use" state of the data block.

In an embodiment, the array may be a RAID 6 array that uses two parity columns, so as to recover from a double disk failure. The two parity columns may be distributed in respectively different directions, for example horizontal and diagonal or two opposing diagonals.

In an embodiment, different amounts of spare capacities may be defined for different sections made up of a collection of stripes. In such a way, different levels of performance or quality of service (QOS) may be provided for different sections over the array.

Considering some of the above points in greater detail, the present embodiments utilize over-provisioning of capacity in order to reduce the 10 overhead of the underlying RAID scheme. The controller may reduce the overhead by always seeking the emptiest stripe, and writing multiple pages to that stripe. In effect the system always fills the emptiest stripe. In order to make sure the emptiest stripe has a lot of free space, all that is needed is to keep some free space in the system. If the system randomizes the mapping between logical and physical locations, and thus causes data blocks to be discarded from stripes at random, the emptiest stripe will have at least twice the average free space of the array.

The constraints on free space may be array wide, or alternatively, the system may be considered as a collection of separate sections, each containing its own quality of service guarantees, enforced by keeping a different percentage of spare space.

The system does not need to keep dedicated spare space for recovery purposes. Instead, the array may treat recovered data in a similar manner to user data, and simply write the recovered data to somewhere else in the array.

State 5.3 illustrates the state of the system after insertion of a new disk. The amount of spare space is reduced due to writing data recovered from the failed disk, and then the new disk is simply inserted. The data blocks in the new disk may be marked as "not in parity" to avoid zeroing out the physical data.

The system may allow for flexible addition and removal of disks. When adding or replacing a disk no data need be written to the new disk in order for the system to regain its redundancy. In fact, many times redundancy will have been regained before the addition of another disk. The number of added disks is limited only by the number of available slots, and the system may increase its capacity and performance by adding more disks over time. Multiple failures do not require disk replacement, so long as there remains enough available (regular) space to write the recovered data.

In order to fully utilize the performance of the underlying disks, data may be kept balanced between disks. State 5.4 illustrates a typical disk state after rebalancing with the new disk. When a disk is removed its data may be dispersed between the remaining disks. When a disk is added it may be filled, either implicitly through user writes or explicitly, until it is balanced with the existing disks.

Fast rebuild abortion is a useful feature of the present embodiments. In fact, if a failed disk returns to proper operating condition, no work needs to be done in order to stop the rebuild process. The recovered data which was copied to other disks may be read from the disks. Data which has not yet been recovered may be read from the returned disk. Data rebalancing may then be performed in the background if needed, but need not delay the disk's availability. The above allows the rebuild decision to happen the instant a disk is found to be faulty (or removed), without keeping the system in degraded mode while waiting for it to recover.

The system also supports temporary disk failures, or hiccup management. When a disk fails temporarily, reads may be serviced using the underlying RAID scheme's degraded mode read functionality, where the data is recovered from the redundancy information kept. Writes may be diverted away from such disks.

Architecture Description

In order to support the features listed above, table 18 is used to provide what may be a very granular mapping table between logical and physical offsets. The table may be kept as small as the application's typical block size (e.g. 4 Kbytes of data). The map may be used to understand where data is kept on disk, and may be updated whenever data is written by the user, or rewritten by the system itself for the purpose of rebalancing between disks or data recovery.

A reverse mapping between physical offset and logical offset may be provided for efficient rewriting of data according to a physical offset, for example when a failed disk needs to be rebuilt. The mapping may be either kept in memory, or kept only on disk to save memory space. In disks which have extra space per block for metadata, the information may be kept in the space reserved for metadata. In cases where the system is content based and the logical offset is based on a hash value of the data itself, the reverse mapping may be computed.

A bitmap, indicating which blocks are taken and which are free, can be used for efficient searching for free locations. Adding a third state to the bitmap as discussed above, in addition to "taken" and "free" states, can help in reducing the need to format disks as well as reducing the overhead of aborting a rebuild process. This third state—"all zeros" or "not in parity" may indicate that a block is free, and that the data written should be assumed to equal all zeros for redundancy purposes, regardless of the actual data written on disk in this physical position. For example, in RAID-5 or in parity based RAID-6, such a block will be considered as not being part of the parity block. For this reason the term "not in parity" is used.

When inserting a blank disk, all blocks on it may be marked "not in parity". Additionally, when a failed disk is being rebuilt, its blocks may be marked as "not in parity" once they are recovered and rewritten to different locations. The benefit this gives is that the bitmap is always in a correct state. If the disk was to return so that the recovery could be aborted, the data blocks not yet recovered can be used directly, and the recovered blocks are already marked as having been zeroed.

The metadata can for example be protected under a separate RAID scheme from the rest of the data, namely the content and parity data. The metadata may be significantly smaller and thus may be based on a less efficient scheme. Volatile data structures may include an indication of how many free slots each stripe has, and an ordering of stripes according to free slots. Such structures may aid in finding the freest stripe to write to at any given moment in an efficient manner.

No Dedicated Spare Space for Recovery

The disk array may use an approach which does not mandate keeping dedicated spare space. In fact, the exact same disk space used for normal system writes may also be used for data recovery. The number of failures that the system can support without human intervention involving replacing the failed disks may be limited only by the amount of free capacity presently available in the array. Additionally, the present embodiments allow simple addition and removal of disks from the array, since it is based on a variable sized RAID stripe strategy. Keeping non-dedicated spare space is cleaner and more flexible than previously used methods and may require nothing more than a very granular (e.g. at the 4K block level) mapping between logical and physical locations, and the ability to place (and re-place) each block of data at any available physical position on disk.

The present embodiments may support variable sized stripes that may grow and shrink according to the number of disks, and are preferably but not necessarily kept equal to the number of disks. This contrasts with prior art systems which generally used fixed stripe sizes which were smaller than the number of available disks. Variable stripe size allows dynamic optimizing in terms of parity overhead. Moreover, the spare space is used to help with RAID 10 overhead as will be discussed in greater detail hereinbelow, thus increasing performance during normal system operation.

When a disk fails the array may perform two operations. First, the array may write the lost data in other stripes, which includes some overhead of updating parity information for those stripes. Second, the array may update the parity information of all the stripes in the array, because the stripe size may have decreased. Note that these two operations can be united into a single operation to reduce the number of IOs. In cases where stripe sizes are smaller than the number of disks, it may be necessary to move around data which was not lost, in order to decrease the stripe sizes of stripes not present on the failed disk. All the writes are distributed over all of the disks, and when a disk is added the stripe size is increased accordingly.

Flows

The main process flows are discussed below with reference to FIGS. 6 to 9, and include procedures for removing a disk, reinserting a removed disk before it's rebuild process completes and inserting a blank disk.

Removing a Disk

Figure 6:
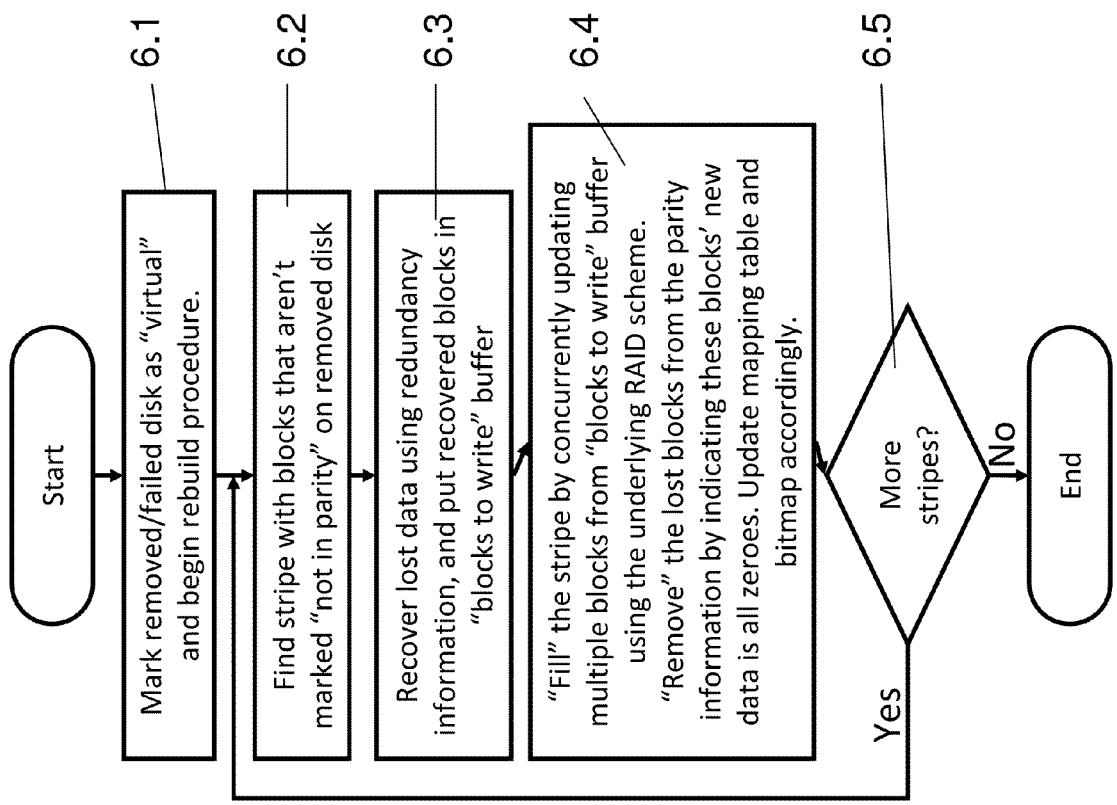
FIG. 6 is a simplified flowchart illustrating a disk removal procedure according to an embodiment of the present invention.

Reference is now made to FIG. 6, which is a simplified flow chart illustrating a disk removal procedure using an embodiment of the present invention. When removing a disk, the array may or may not have the opportunity to read its contents beforehand. If the array does read the disk's contents before removing it, for example in the case of a worn out SSD which indicates it cannot accept new write commands, then all that is required is to read the appropriate data blocks from the disk which is pending removal and move them elsewhere, by following the procedure described below, before removal. If, on the other hand, the disk was removed unexpectedly or failed for some reason, its data may be recovered from the underlying RAID scheme and its redundancy information.

The disk that has failed or been removed may initially be marked as virtual—stage 6.1.

Disk removal may then initiate a RAID rebuild process.

In stage 6.2, the blocks that are not marked "not in parity" are identified as the ones that need to be recovered. Blocks marked as in use must be recovered, written elsewhere, and removed from the parity. Blocks marked as free must only be removed from parity.

The rebuild process includes recovering all lost data and writing it elsewhere. These writes may be scattered across other stripes, just as user writes are written, and they may include updating the mapping table with the new physical offsets of the moved pages. Lost parity information may be rewritten in a well balanced manner on the remaining disks.

In stage 6.3, redundancy information is used to recover the data in the missing blocks. If the failed disk can still be read from, data can simply be read from it instead of using redundancy information. The recovered data is placed in the write buffer or write cache 14 in FIG. 4

In stage 6.4, the recovered blocks are written into existing spaces in stripes in accordance with the underlying RAID scheme. That is to say data is written into the stripe with the most space first and then into the next stripe. During writing, new parity data is created and may be rebalanced across the available disks. The data that the new parity columns overwrite may be written elsewhere, just like any other lost data. In addition, the array may update the parity information of all stripes which have lost data. The lost data may be zeroed out, that is marked as not in parity, and in an embodiment, the array may turn the lost disk into a virtual disk and decrease the stripes size by one. An optimization includes updating each parity page only once. Thus, when filling a certain stripe with lost data, the array may simultaneously update its parity information to reflect the new virtual disk.

A method for keeping track of the rebuild process includes the use of a three way bitmap as discussed above. Instead of keeping a binary bitmap indicating which pages are free and which are taken, the three-way bitmap may indicate for each block or page whether it is free, taken or not-in-parity. If it is taken then it has actual data. If it is free, it can be overwritten but the data it holds has been used as part of the parity computation. If it is not-in-parity, and the disk is not virtual, then the slot is free and the data written there is arbitrary but should be considered zero as far as the parity is concerned. During rebuild, when updating a stripe's parity information, one can simply update the bit to not-in-parity. If a disk is reinserted, the controller knows that all the not-in-parity stripes have been rebuilt, and that the rest have not. The mapping table will also reflect this.

Reinserting a Disk Before Rebuild is Completed

Figure 7:
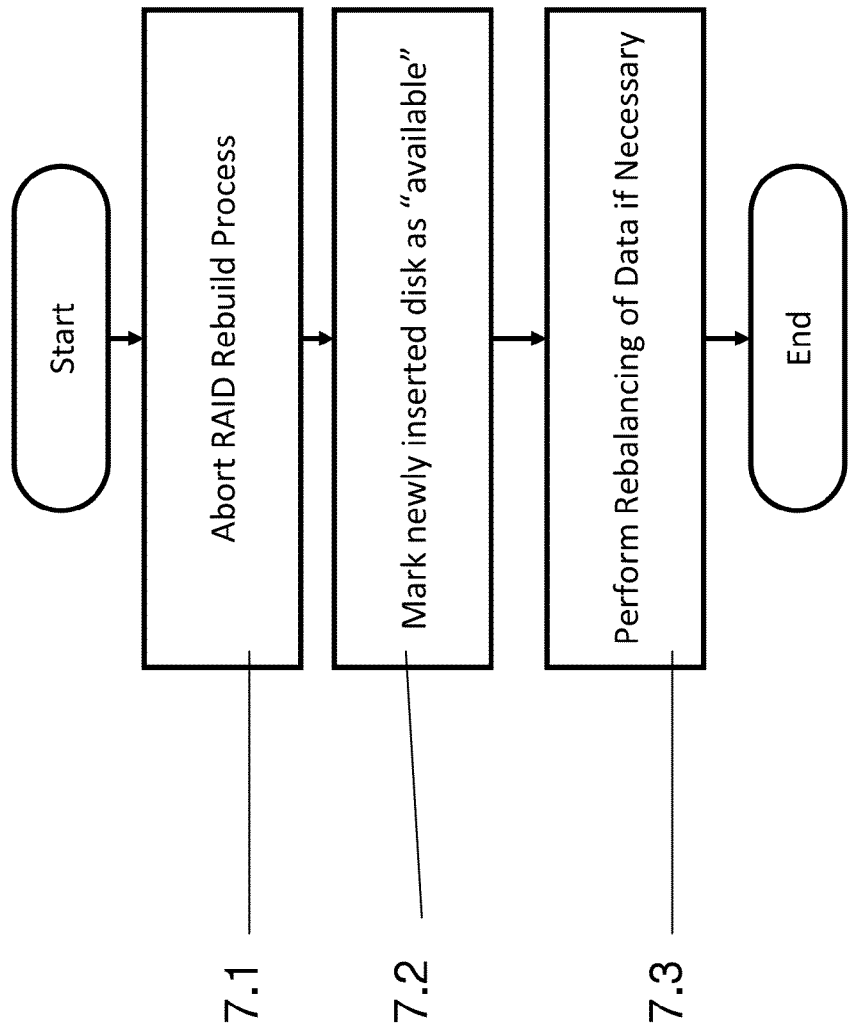
FIG. 7 is a simplified flowchart of a disk re-insertion procedure according to an embodiment of the present invention.

Reference is now made to FIG. 7, which is a simplified flow diagram illustrating a procedure for aborting a data rebuild process that has already begun but not yet finished. When re-inserting a disk, or when a disk comes back to life, the array may take advantage of the data on this disk by aborting the rebuild process 7.1. If the rebuild process was in progress, it may be aborted. All zeroed blocks, marked as not in parity, have been removed from their stripe's parity blocks. If they were previously used they were also recovered and are present elsewhere. All non-zeroed blocks may be used as they are. Thus the disk may simply be marked as available—stage 7.2.

Finally, in stage 7.3, rebalancing of the data may be carried out to ensure even wear of the disks. However for frequently used systems explicit rebalancing may not be necessary, because user writes will cause the system to rebalance implicitly.

Figure 8:
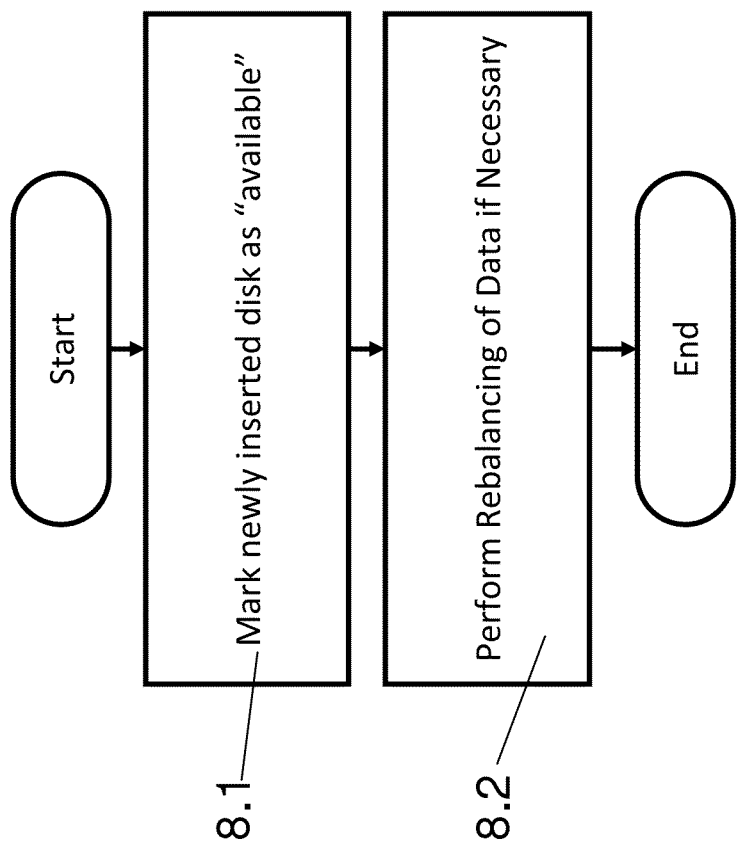
FIG. 8 is a simplified flowchart of an empty disk insertion procedure according to an embodiment of the present invention.

Reference is now made to FIG. 8, which is a variation of the procedure of FIG. 7, for a case in which the disk is inserted after the rebuild operation is complete. If the rebuild process is complete, the reinserted disk may be considered as insertion of an empty disk, and the entire disk is marked as not in parity, or available—stage 8.1. Again rebalancing—stage 8.2, is carried out as necessary.

The above procedure allows for treating of the locations of the pages which were already moved by the rebuild process as free locations, and keeping the pages which the rebuild process did not yet reach in their previous state. By holding a three-way-bitmap as described above, the process is reduced to simply stopping the rebuild which is in progress, with no extra overhead and no further change of state.

Some rebalancing may be achieved by copying parity and content data back to the returned disk. This of course does not have to happen explicitly, it can happen implicitly as user writes arrive. If explicit copying of data is performed, the data to be copied can be arbitrary, and should be chosen according to RAID efficiency considerations, for example by emptying the fullest available stripes, and copying their blocks to the reinserted disk.

Adding an Empty Disk

When an empty disk is added, no trimming or zeroing is required since all blocks on this disk may simply be initially marked as not in parity. The procedure of FIG. 8 is also suitable for addition of a new or empty disk.

The only requirement on insertion of a new disk may be to update the volatile metadata, for example the list of stripes and a corresponding counter of the empty pages in each stripe, with the empty pages that are now present in this newly inserted disk. The bitmap may not need updating, since the bitmaps of these previously virtual sections were all marked appropriately, as not in parity.

It may be the case that over a fairly short period of time, user writes cause the capacity utilization to balance between the new disk and the old disks. Otherwise data can be proactively moved to the new disk. Parity information can be moved to the new disk, in order to regain balance in the parity column distribution between disks. It is interesting to note that if the underlying RAID scheme (e.g. RAID 5) keeps the old parity block as a free block which is part of the newly expanded parity set, the new set's parity may equal zero, thus not requiring to write anything to the new disk in this case. The above assumes parity blocks can also be marked as "all zeros".

Reducing IO Overhead

A problem with parity based RAID schemes, as opposed to mirroring schemes, concerns the 10 overhead incurred upon user writes during regular system operation. In all known schemes, encoding a full stripe is much more efficient in terms of IOs and computation, than updating a single block in that stripe. Moreover, the efficiency scales significantly with respect to the number of blocks updated concurrently.

Thus, always choosing the emptiest stripes to fill and then filling them as much as possible with aggregation of write operations can reduce the 10 overhead significantly. To increase this effect even more, one can over-provision the system's capacity by keeping (possibly different levels of) spare space. Another option one can use to further amplify this effect, is to separate static and dynamic data. Both these methods may cause the emptiest stripe to be much emptier than the average stripe in the system. In some cases, using such methods may reduce the need for more performance oriented RAID schemes such as mirroring. Keeping relatively little spare space may reduce the steady state IO overhead of parity based RAID schemes with double parity, such as RAID-6, to the level of RAID-1. Moreover, where RAID-1 includes two writes per user write, RAID-6 with spares can in this case induce only 1.1 writes on average, thus significantly increasing SSD endurance by writing much less. In many cases it may be favorable to choose RAID-6 with spares over RAID-1. Surprisingly, this will most likely increase resiliency, since RAID-6 supports double disk failure, and SSD endurance because the number of writes is nearly halved, without degrading capacity utilization and performance under normal system operation. Moreover, the tradeoff between capacity and performance can easily be tuned.

Write Flow

Figure 9:
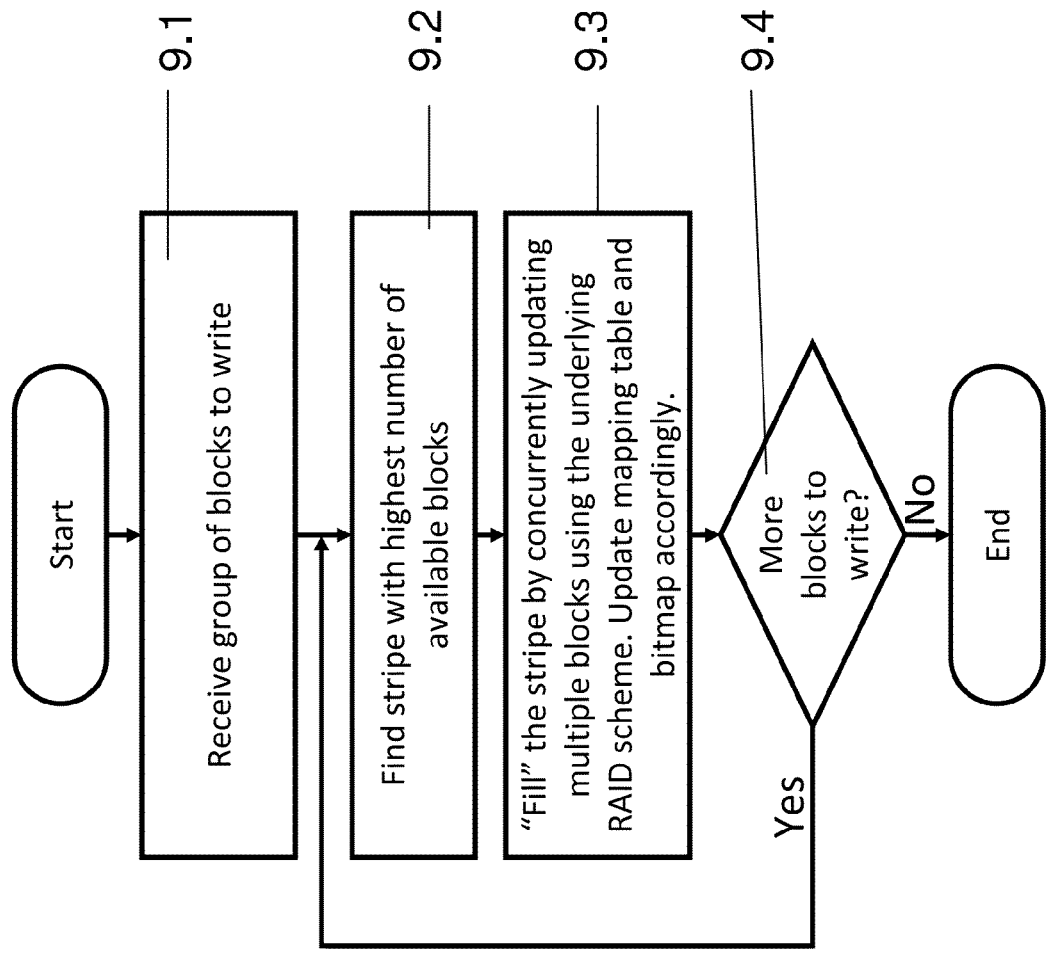
FIG. 9 is a simplified flowchart of a write procedure in accordance with an embodiment of the present invention.

Reference is now made to FIG. 9, which is a simplified diagram illustrating write flow according to an embodiment of the present invention. When performing write operations, the array may write multiple pages together and fill stripes in the process—9.1. The multiple pages or blocks are stored in the buffer. Then, in 9.2, the array may, as discussed, find the emptiest stripe, and write user data to the free blocks in the stripe, marked as free or as not in parity. In 9.3, relevant parity pages may also be recomputed and updated. The array may then update its bitmap according to the newly taken pages, and also update the logical to physical mapping table.

In the case of external hiccup management as described below, if one of the disks cannot be written to currently, the system may find a stripe which is not contained in the temporarily unavailable disk. In the case of internal hiccup management, the system may not fill the empty pages present in the failed disk. It may make sense to find a stripe which has a maximum number of free pages on properly working disks, or alternatively, the stripe can be left partially free. In both hiccup management scenarios, the array may avoid writing to a stripe which has a parity column on an unavailable disk.

In the case in which part of a stripe in question resides on a removed disk, which is currently being rebuilt, the writing process may aid the rebuild process by updating the stripe's parity data in accordance with the removed blocks contained on the removed disk. Such updating requires initiating another write process for these recovered blocks if there is not enough free space to write them to other free locations in the current stripe.

Hiccup Management

In order to deal with hiccups while trying to write full stripes, the array may do one of two things:

External Hiccup Management—includes reducing the stripe size so as not to encompass all of the disks. For example, if the stripe size includes all disks except for one, and the stripes are distributed evenly across the disks, a fixed percentage of the stripes will not reside on any given one of the disks. When a disk encounters write problems, the array may simply be able to update stripes which do not reside on that disk. To deal with more than one concurrent disk hiccup, the system may further reduce the stripe size. Such a method is named external hiccup management, since it manages hiccups above the stripes. Its downside is the increased parity overhead.

Internal Hiccup Management—a second option is to write around the failed disk, by updating only the blocks of a certain stripe which do not reside on the failed disk. This has the advantage of reduced parity overhead, since the stripes are larger. However, this method does not fill stripes completely, and thus slightly hurts the efficiency of the IO reduction methods described above. Another benefit of this method is that there is no limit on the number of concurrent hiccups that can be dealt with.

In order to deal with reads directed at temporarily failed disks, one can use the underlying RAID scheme's rebuild functionality to recover the data from the RAID scheme's redundancy information.

Supporting Disks of Different Sizes

In order to optimally support disks of different sizes one should fix the stripe size according to a weighted average of the disk sizes, computed by taking the full capacity of the array and dividing by the capacity of the largest available disk. For example, if we have X disks of size N and another X disks of size 2N. Then the stripe size may be NX+2NX divided by 2N which equals 1.5X. As another example, if we have 2X disks of size N and another X disks of size 4N, the stripe size may be 2NX+4NX divided by 4N which is again 1.5X. The various stripes may be evenly distributed between the available disks, in proportion to each disk's capacity.

Balanced Parity Column Distribution Across Disks

Parity columns of the various stripes may be distributed evenly across the available disks. Moreover, when a disk is removed, only parity columns from that disk need be moved in a balanced manner to all of the remaining disks and when a disk is added, parity columns may be moved only to the new disk, in a balanced manner from all previously available disks. Such mapping between stripe id and the disks containing the corresponding parity columns can be done statically using a permutation of disk ids per stripe, thus requiring no extra metadata. This permutation can be generated in a pseudo random manner, where the seed is based on the stripe id. The location of the parity column may be determined by the first disk id in the permutation which contains a non-virtual, or available, disk. For example, in a system which can potentially hold 8 slots, we can assume the permutation of stripe X is <2, 7, 5, 6, 1, 0, 4, 3>. If disks 2 and 5 are virtual, the parity column will reside on disk 7. If disk 7 fails the column may be moved to disk 6. If disk 2 is inserted the column may be moved to disk 2.

In a similar manner, in cases such as RAID-6, where there are two parity columns, their location can be decided according to the permutation by having the first column reside on the first available disk starting from the left of the permutation, and the second parity column reside on the first available disk starting from the right of the permutation. In the previous example, if all disks are present, the first column will reside on disk 2, and the second on disk 3.

Stripe Sizes and Distributions Across Disks

The simplest stripe distribution may involve having each stripe present on all of the available disks. This is made possible by a variable size stripe scheme. Possible reasons to keep stripe sizes smaller than the number of disks, is to support the above-described external hiccup management, or to support various sized disks. If such support is required, and one concurrent disk hiccup is to be supported, there exist X possible stripe distributions for a configuration which includes X disks, since each stripe may be present on all disks except for one. This can be generalized to smaller stripe sizes as well.

When stripe sizes are smaller than the number of disks, choosing which disks each stripe is present on can be done using a similar technique. If for example the stripe size is X, it may reside on the X first available disks in its pseudo random permutation. This can also be performed on groups of stripes, as long as enough granularity is provided.

It is expected that during the life of a patent maturing from this application many relevant memory arrays, raid schemes and disks will be developed and the scope of the corresponding terms is intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A disk array memory system comprising
a plurality of disks in a disk array for storage of content data and parity data in stripes, content data in a same stripe sharing parity bits of said parity data, each stripe having a spare stripe capacity including at least some of a predefined array spare capacity, said array spare capacity providing a dynamic space reserve over said array to permit data recovery following a disk failure event;

a cache for caching content data for aggregation prior to writing to said disk array;

a controller configured to select a stripe currently having a largest spare stripe capacity, for a current write operation of aggregated data from said cache, thereby to write all said aggregated data of said current write operation on a same stripe, thereby to maximize sharing of parity bits per write operation and minimize separate parity write operations.

2. The disk array memory system of claim 1, further comprising a table for mapping of physical locations of said content data as defined by respective write operations with corresponding logical locations of said data.

3. The disk array of claim 2, wherein said data is written on said disks in blocks and wherein a granularity of said table is a size of said blocks.

4. The disk array memory system of claim 2, wherein said controller is configured to use said table to balance write operations between respective disks of said array.

5. The disk array memory system of claim 2, wherein said controller is configured to use said table to divert a current write operation from a disk which is temporarily unavailable.

6. The disk array memory system of claim 1, wherein said disk array has a stripe size, said stripe size being differentially variable.

7. The disk array memory system of claim 6, wherein said disks in said array have respectively different capacities, said stripe size being such as to provide for even distribution of stripes over said disks, in proportion to said respective capacity at each disk.

8. The disk array memory system of claim 7, said stripes having parity columns for said parity bits, said parity columns being distributed evenly over said disks.

9. The disk array memory system of claim 1, wherein said controller is configured to use said parity data to recover content data lost in said disk failure event and to write said recovered content data into said dynamic space reserve.

10. The disk array memory system of claim 1, wherein said disk array is arranged into blocks, and wherein each block is assigned one of three states, in use, not in use and not in parity, said not in parity state allowing for ignoring physical data and treating it as zeroed out.

11. The disk array memory system of claim 1, configured as a RAID 6 array using two parity columns, said two columns being distributed in respectively different directions.

12. The disk array memory system of claim 1, wherein different amounts of spare stripe capacities are defined for respective sections, thereby to provide variable levels of performance over said array.

13. A disk array memory system comprising
a plurality of disks in a disk array for storage of content data and parity data in stripes, content data in a same stripe sharing parity bits of said parity data,
a cache for caching content data prior to writing to said disk array;
a controller configured to select a stripe for a current write operation of data from said cache, thereby to write all said content data of said current write operation and corresponding parity data on a same stripe at a same physical location, and irrespective of logical relationships of parts of said content data; and the controller utilizing a mapping table to map between physical locations and logical relationships of said content data.

14. A disk array memory method comprising
providing a plurality of disks in a disk array,
storing content data and parity data in stripes within said disk array, wherein content data in a same stripe shares parity bits of said parity data,
for said array defining an array spare capacity, said array spare capacity providing a dynamic space reserve over said array to permit data recovery following a disk failure event;
caching content data to aggregate data from multiple write operations into a single aggregated write operation prior to writing to said disk array;
selecting a stripe having a largest spare stripe capacity;
writing said aggregated cached data in a single write operation to said selected stripe, thereby to maximize sharing of parity bits per write operation and minimize separate parity write operations.

15. The disk array memory method of claim 14, comprising mapping, using a table, of physical locations of said content data as defined by respective write operations with corresponding logical locations of said data.

16. The disk array method of claim 15, wherein said table has a granularity of a data block.

17. The disk array memory method of claim 15, comprising using said table to balance write operations between respective disks of said array.

18. The disk array memory method of claim 15, comprising using said table to divert a current write operation from a disk which is temporarily unavailable.

19. The disk array memory method of claim 14, wherein said disk array has a stripe size, said stripe size being differentially variable.

20. The disk array memory method of claim 19, wherein said disks in said array have respectively different capacities, said stripe size being such as to provide for even distribution of stripes over said disks, in proportion to said respective capacity at each disk.

21. The disk array memory method of claim 20, said stripes having parity columns for said parity bits, said parity columns being distributed evenly over said disks.

22. The disk array memory method of claim 14, comprising using said parity data to recover content data lost in said disk failure event and to write said recovered content data into said dynamic space reserve.

23. The disk array memory method of claim 14, wherein said disk array is arranged into blocks, and wherein each block is assigned one of three states, in use, not in use and not in parity, said not in parity state allowing for ignoring physical data and treating it as zeroed out.

24. The disk array memory method of claim 14, configured as a RAID 6 array using two parity columns, said two columns being distributed in respectively different directions.

25. The disk array memory method of claim 14, wherein different amounts of spare stripe capacities are defined for respective sections, thereby to provide variable levels of performance over said array.

26. A disk array memory method comprising
providing a plurality of disks in a disk array for storage of content data and parity data in stripes, content data in a same stripe sharing parity bits of said parity data,
caching content data prior to writing to said disk array;
selecting a stripe for a current write operation of data from said cache, thereby to write all said content data of said current write operation and corresponding parity data on a same stripe at a same physical location, and irrespective of logical relationships of parts of said content data; and
utilizing a mapping table to map between physical locations and logical relationships of said content data.

* * * * *